April 21, 1942.    C. ROSSINI ET AL    2,280,131
BROILER
Filed March 25, 1941
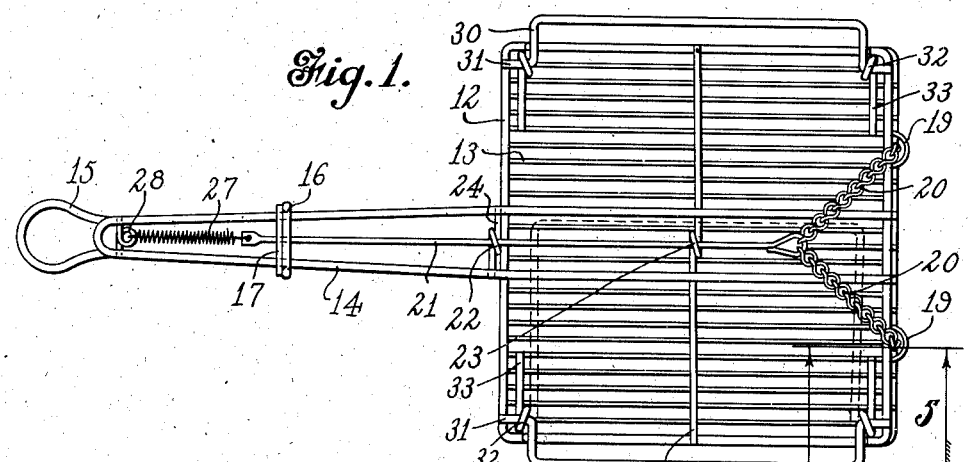
Fig.1.
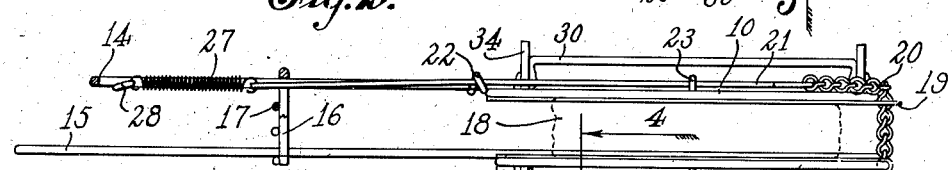
Fig.2.
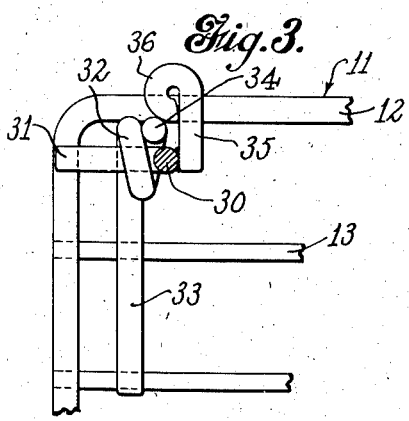
Fig.3.
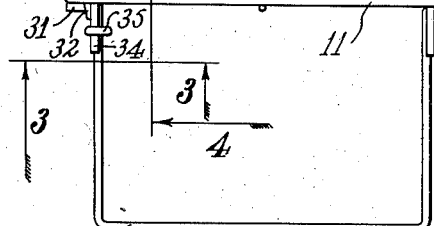
Fig.4.
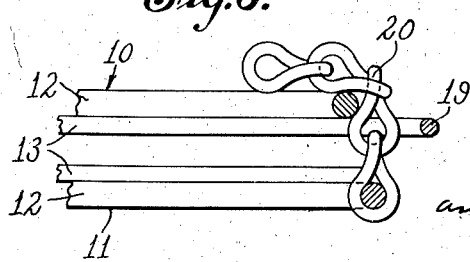
Fig.5.
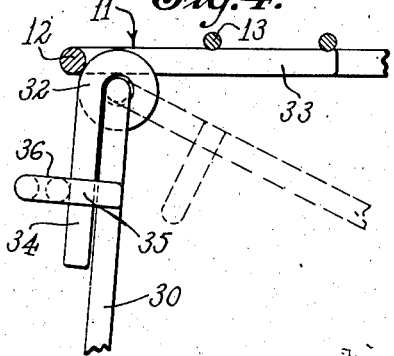
Inventor
Caesar Rossini
and Tazio D. Pieragostini
By Rockwell Bartholow
Attorneys Patented Apr. 21, 1942

2,280,131

UNITED STATES PATENT OFFICE 2,280,131

BROILER

Caesar Rossini and Tazio D. Pieragostini,
New Haven, Conn.

Application March 25, 1941, Serial No. 385,097

10 Claims. (Cl. 53—5)

This invention relates to broilers, and more particularly to a broiler which comprises a pair of cooperating grid members connected together adjacent one side, whereby they can be swung apart to receive material to be broiled, and thereafter clamped together to hold the material during the broiling operation.

As is usual in devices of this character, the grid members are of substantially the same shape and configuration, and are provided with projecting handles by which they may be manipulated. Owing to the fact that they are commonly made of a metal which is a good conductor of heat, the handles become heated and cannot be held in the bare hands during the broiling operation. Also when the broiler is filled it is of considerable weight, and to hold it adjacent the ends of the handles where the latter are the coolest is fatiguing to the operator. To avoid this disadvantage the broiler shown in the present application is provided with swinging supporting members which may be swung into planes at right angles to those of the broiler when in operative position, and when in inoperative position may be swung inwardly to lie substantially flatly against the grid members, so that they require but little more room than would be required if these members were omitted.

It is necessary in the use of broilers of this character to handle material of varying thicknesses. That is, in some instances the material which it is desired to broil is cut in very thin slices, while in other cases the material will be of considerable thickness. For this reason it is desired to so arrange the device that the grid members may be clamped together in various spaced positions, and at the same time securely engage the material in the broiler or between the grids in each of these positions. In the present instance this is arranged by the provision of a novel construction wherein the grid members are resiliently urged into contacting relation, or urged toward each other by the action of a spring, so that they will always tightly grip the material placed between them.

One object of the invention is the provision of a broiler of new and improved construction.

A further object of the invention is the provision of a broiler comprising a pair of substantially identical grid members adapted to be secured together adjacent one edge of each of these members, so that they may be swung apart in a pivotal manner to receive the material to be broiled, and at the same time when closed will be urged toward each other so as to tightly grip this material.

A still further object of the invention is the provision of a broiler of the character described with supporting members adapted to support the broiler over a fire or other heat source so that it will not have to be held by the operator during the broiling operation, the supporting members being so arranged that when not in use they may be folded against the grid members of the broilers so as to occupy a minimum of space.

To these and other ends the invention consists in the novel features and combinations of parts to be hereinafter described and claimed.

In the accompanying drawing:

Fig. 1 is a top plan view of a broiler embodying my invention;

Fig. 2 is a side elevational view of the broiler with the upper supporting members folded to inoperative position, and the lower supporting members swung to operative position, a portion of the upper handle member being broken away for the sake of clearness;

Fig. 3 is a detail sectional view on line 3—3 of Fig. 2, showing the locking means for holding the supporting members in operative position;

Fig. 4 is a sectional view on line 4—4 of Fig. 2, showing another view of the locking members; and Fig. 5 is a sectional view on line 5—5 of Fig. 1.

To illustrate a preferred embodiment of my invention, I have shown a pair of grid members 10 and 11 of substantially the same shape and size. As shown in Fig. 1, each of these grid members may comprise a rectangular frame 12, the forward and rear ends of which are joined by spaced wires 13. The wires 13 may be secured to the end members of the rectangular frame 12 by spot welding or a similar operation. The grid members are provided with projecting handles 14 and 15, respectively. As illustrated, the lower handle member 15 is slightly longer than the upper, and has slidably mounted thereon a loop or clamping member 16 which is designed to be slipped over the upper handle so as to hold the grid members in closed position. The clamp member 16 may be of substantially rectangular outline, and provided with one or more spaced cross bars 17 so as to provide a number of passages between these cross bars and the upper and lower ends of the rectangular clamping member to receive the handle 14 in a number of spaced positions of the latter with respect to the handle 15, so that, regardless of the thickness of the material 18 between the grid members, the handles may be clamped to lie in substantially parallel positions.

The grid members 10 and 11 are connected at their forward ends in a novel manner, this connection serving as a hinge to permit the opening of the grid members, but at the same time permitting separation of these members at their forward edges to accommodate various thicknesses of material, and at the same time serving to urge these members together so as to securely clamp the material placed between them.

As shown, the upper grid is provided with a pair of eyes 19 which may be conveniently formed by the projecting U-shaped or bight portion of a pair of rods or wires 13. They may, of course, be formed separately from the wires 13 and secured to the frame 12 by spot welding, if desired. To the forward edge of the grid member 11 are secured a pair of flexible elements 20 illustrated as short pieces of chains, which elements pass freely through the eyes 19, and at their other ends are secured to a rod or wire 21. This rod is arranged longitudinally of the upper grid at substantially its central portion, and is slidably mounted on this grid by being passed through eyes 22 and 23, these eyes, in the form of our invention shown, being formed by coiling the intermediate portions of a wire 24 extending across the handle member 14 and a wire 25 extending across the upper grid.

It will be understood that the handle member 14 comprises a pair of spaced wires or rod members, as shown, and the member 21 lies in substantially the plane of these members and between them. As stated, one end of this rod member is connected to the flexible members 20, and to the other end is secured one end of a tension spring 27, the other end of which is secured to an eye 28 carried by the outer end of the handle 14. As the member 21 and spring 27 lie substantially in the plane of the two spaced members comprising the handle 14, as clearly shown in Fig. 2, these members will not interfere with the sliding of the clamping device over the handle 14, nor will they interfere with the gripping of the handles by the operator. At the same time the spring 27 will through the rod 21 exert tension upon the flexible members 20 so as to urge the forward ends of the grid members 10 and 11 as near to each other as is permitted by the material between them.

It will be understood that the parts will be so arranged that when there is no material between the grids the forward portions of the latter will be held substantially in contact by the spring 27, so that the chain and loop or eye connection will act substantially as a hinge to permit the members to be swung open by their handles to receive the material to be broiled. When, however, this material has been placed between them and the handles are closed, the resilience of the spring 27 will permit the rear edges of the grid members to separate and adjust themselves to the thickness of the material, while at the same time urging the members together so that the material will be tightly clamped between them. When the handles have been brought to substantially parallel position, the clamping member 16 may be slipped over the upper handle so that the material to be broiled will be clamped in place.

There is also provided in the present construction means for supporting the broiler so that it need not be held by the operator during the broiling operation. As it is desirable to broil material on both sides, these supporting members are provided on both upper and lower grids, but as they are substantially identical, description of one thereof will suffice. These supporting members comprise substantially U-shaped frame members 30, there being one of these members provided at each side edge of the upper and lower grids, four of them in all being employed. Each of the U-shaped members 30 is provided with turned ends or trunnions 31 which may be passed through loops or eyes 32 formed by a coil in a rod member 33 secured to the grid. It will be understood that the members 30 are of sufficient resilience so that their lower ends may be contracted or drawn together to a sufficient extent to permit the passage of the ends 31 through the loops or eyes 32, the members 30 thereafter expanding under their own resilience so that the connection will not become accidentally detached.

In order to hold these supporting members securely in their operative positions shown at the lower portion of Fig. 2, for example, wherein the lower supporting member 30 stands at substantially right angles to the grid 11, or in a substantially vertical position, the wire or rod forming the loop 32 is continued in a vertical direction to form a post 34 projecting outwardly from the grid to which it is secured. Cooperating with this post is a catch element 35 secured to the leg of the supporting member 30, the catch element being provided with a rounded end 36 to engage and be releasably held by the post 34 when the member 30 is swung to operative position. It will be understood that the lower portions of the members 30 may be sprung inwardly toward each other to a sufficient extent to permit the catch member 36 to pass by the post 34 when the supporting member 30 is moved. As shown in Figs. 2, 3 and 4, this supporting member is in operative position, standing in a vertical position at substantially right angles to the grid 11, and the catch member 36 is engaged with the post 34 to releasably hold the member 30 in this position. When it is desired the members 30 may be swung to inoperative position by disengaging the member 36 from the post 33, which may be done merely by swinging the member 30 toward the grid, the rounded surface of the catch 36 acting as a cam to move the lower end 31 of the member 30 inwardly to a sufficient extent to permit the catch 36 to pass by the post 34. The folded position of one of the members 30 is shown in Fig. 1, and it will be understood that these members may be folded to lie substantially flatly against the grids 10 and 11, so that they will be out of the way when not in use, and the broiler will occupy very little space in addition to that occupied by the grids 10 and 11.

While we have shown and described a preferred embodiment of our invention, it will be understood that it is not to be limited to all the details shown, but is capable of modification and variation within the spirit of the invention and within the scope of the appended claims.

What we claim is:

1. A broiler comprising a pair of cooperating grid members adapted to be superposed one above the other, a handle secured at one side of each of said members and projecting therefrom, means to clamp said members together, a flexible element secured to one element adjacent an edge thereof and passing over the adjacent edge of the second member, and means including a spring to secure said element to the second member whereby said members are urged toward each other.

2. A broiler comprising a pair of cooperating grid members adapted to be superposed one above the other, a handle secured at one side of each of said members and projecting therefrom, means to clamp said members together, a flexible element secured to one element adjacent an edge thereof and passing over the adjacent edge of the second member, and means including a tension spring to connect said element to the handle of the second member whereby said members are urged toward each other.

3. A broiler comprising a pair of cooperating grid members, a handle secured at one side of each of said members and projecting therefrom whereby said members and handles may be superposed, means to clamp said handles together, a flexible element secured to one element adjacent the side thereof opposite the handle, said element extending over the adjacent side of the second member, and a spring connected to the second member and said element to hold the latter taut and clamp articles of different thicknesses between the grids.

4. A broiler comprising a pair of cooperating grid members adapted to be superposed one above the other, a handle secured at one side of each of said members and projecting therefrom, means to clamp said members together, supporting members hinged to one grid adjacent each opposite side thereof, said members being swingable to positions to lie flatly against the grid or to stand in operative relation substantially perpendicular thereto, each of said members being provided with a catch, and means on the grid to cooperate with said catch to releasably hold the supporting members in operative position.

5. A broiler comprising a pair of cooperating grid members adapted to be superposed one above the other, a handle secured at one side of each of said members and projecting therefrom, means to clamp said members together, one of said grid members being provided with a pair of eyes at the side thereof opposite the handle, flexible elements secured to the adjacent side of the other grid and passing loosely through said eyes, and means exerting tension on said flexible members to hold them taut and urge said grids into close relation with each other.

6. A broiler comprising a pair of cooperating grid members adapted to be superposed one above the other, a handle secured at one side of each of said members and projecting therefrom, means to clamp said members together, one of said grid members being provided with a pair of eyes at the side thereof opposite the handle, flexible elements secured to the adjacent side of the other grid and passing loosely through said eyes, and means exerting tension on said flexible members to hold them taut and urge said grids into close relation with each other, said means including a tension spring having one end secured to the handle of the first member and the other end connected to the flexible elements.

7. A broiler comprising a pair of cooperating grid members adapted to be superposed one above the other, a handle secured at one side of each of said members and projecting therefrom, means to clamp said members together, one of said grid members being provided with a pair of eyes at the side thereof opposite the handle, flexible elements secured to the adjacent side of the other grid and passing loosely through said eyes, and means exerting tension on said flexible members to hold them taut and urge said grids into close relation with each other, said means including a tension spring having one end secured to the handle of the first member and the other end connected to the flexible elements, and said spring lying in the plane of the handle member to which it is secured.

8. A broiler comprising a pair of cooperating grid members adapted to be superposed one above the other, a handle secured at one side of each of said members and projecting therefrom, means to clamp said members together, one of said grid members being provided with a pair of eyes at the side thereof opposite the handle, flexible elements secured to the adjacent side of the other grid and passing loosely through said eyes, and means exerting tension on said flexible members to hold them taut and urge said grids into close relation with each other, said means including a spring having one end secured to the handle of the first grid and a rod secured to the other end of said spring and connected to said flexible elements.

9. A broiler comprising a pair of cooperating grid members adapted to be superposed one above the other, a handle secured at one side of each of said members and projecting therefrom, means to clamp said members together, one of said grid members being provided with a pair of eyes at the side thereof opposite the handle, flexible elements secured to the adjacent side of the other grid and passing loosely through said eyes, means exerting tension on said flexible members to hold them taut and urge said grids into close relation with each other, said means including a spring having one end secured to the handle of the first grid and a rod secured to the other end of said spring and connected to said flexible elements, and guiding means for said rod on said first grid through which the rod slides.

10. A broiler comprising a pair of grid members adapted to be superposed, a flexible member secured to one of said grids and passing over a portion of the second grid, spring-tensioning means connected to said flexible member to exert a longitudinal pull thereon and keep the latter taut and urge the grids toward each other, a handle member connected to each grid at one side thereof and projecting therefrom, and means to clamp said handle members together.

CAESAR ROSSINI.
TAZIO D. PIERAGOSTINI.